US008174558B2

(12) United States Patent
Smith et al.

(10) Patent No.: US 8,174,558 B2
(45) Date of Patent: May 8, 2012

(54) AUTOMATICALLY CALIBRATING A VIDEO CONFERENCE SYSTEM

(75) Inventors: Matthew David Smith, Corvallis, OR (US); Douglas A. Pederson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1398 days.

(21) Appl. No.: 11/799,274

(22) Filed: Apr. 30, 2007

(65) Prior Publication Data

US 2008/0266385 A1  Oct. 30, 2008

(51) Int. Cl.
*H04N 7/14* (2006.01)

(52) U.S. Cl. ............ 348/14.08; 348/125; 348/180; 370/216; 370/241; 370/259; 370/282; 375/224

(58) Field of Classification Search .... 348/14.01–14.16, 348/125–134, 180–194; 370/216–228, 241–253, 370/259–271, 282–292, 351–356; 375/224–228, 375/354–376
See application file for complete search history.

(56) References Cited

U.S. PATENT DOCUMENTS

| | | | | | |
|---|---|---|---|---|---|
| 5,313,280 | A | * | 5/1994 | Straus | 348/181 |
| 5,506,954 | A | * | 4/1996 | Arshi et al. | 345/501 |
| 5,596,364 | A | * | 1/1997 | Wolf et al. | 348/192 |
| 6,414,960 | B1 | * | 7/2002 | Kuhn et al. | 370/395.64 |
| 7,020,894 | B1 | * | 3/2006 | Godwin et al. | 725/135 |
| 7,043,749 | B1 | * | 5/2006 | Davies | 725/120 |
| 7,154,533 | B2 | * | 12/2006 | Sheldon et al. | 348/192 |
| 2005/0219366 | A1 | * | 10/2005 | Hollowbush et al. | 348/193 |
| 2005/0277421 | A1 | * | 12/2005 | Ng | 455/445 |
| 2005/0281255 | A1 | * | 12/2005 | Davies et al. | 370/389 |
| 2007/0002902 | A1 | * | 1/2007 | Hannuksela | 370/503 |

* cited by examiner

*Primary Examiner* — Hemant Patel

(57) ABSTRACT

A method of automatically calibrating a video conference environment is disclosed. In an embodiment, the method includes initiating a calibration sequence in the video conferencing system, routing a test signal through the audio and video components of the video conferencing system, measuring a time delay associated with the test signal and utilizing the time delay to calibrate subsequent audio and video signal transmissions by the video conferencing system.

21 Claims, 3 Drawing Sheets

```
┌─────────────────────────────────────┐
│  Initiating a calibration sequence  │
│       in the video conference       │
│              system.                │
│               101                   │
└─────────────────────────────────────┘
                   │
┌─────────────────────────────────────┐
│ Routing a test signal through the   │
│      audio and video components.    │
│               102                   │
└─────────────────────────────────────┘
                   │
┌─────────────────────────────────────┐
│ Measuring a time delay associated   │
│         with the test signal.       │
│               103                   │
└─────────────────────────────────────┘
                   │
┌─────────────────────────────────────┐
│ Utilizing the time delay to calibrate│
│  subsequent audio and video signal  │
│ transmissions in the video conference│
│              system.                │
│               104                   │
└─────────────────────────────────────┘
```

FIG. 1

AUTOMATICALLY CALIBRATING A VIDEO CONFERENCE SYSTEM

BACKGROUND

In a video conference environment for performing an electronic conference through a communication network, a video conference system is provided in each of locations in which participants of a conference come together and a plurality of such video conference systems communicate via the communication network. Each video conference system collects image information and audio information in a location in which the conference system is provided. The image information and the audio information are synthesized and the synthesized information is distributed to the respective conference systems. In each conference system, the image information is displayed on a display device provided in the video conference system and the audio information is outputted through a loudspeaker also provided in the video conference system.

In order for the video conference to be conducted successfully, the audio information must be calibrated with the video information so that the lip movement of each participant is synchronized with the associated audio feed. A variety of calibration mechanisms exist for calibrating the audio and video components in the video conference environment, however these mechanisms are expensive and tedious.

BRIEF DESCRIPTION OF THE DRAWINGS

FIG. 1 is a high-level flowchart of a method in accordance with an embodiment.

DETAILED DESCRIPTION

Figure 2:
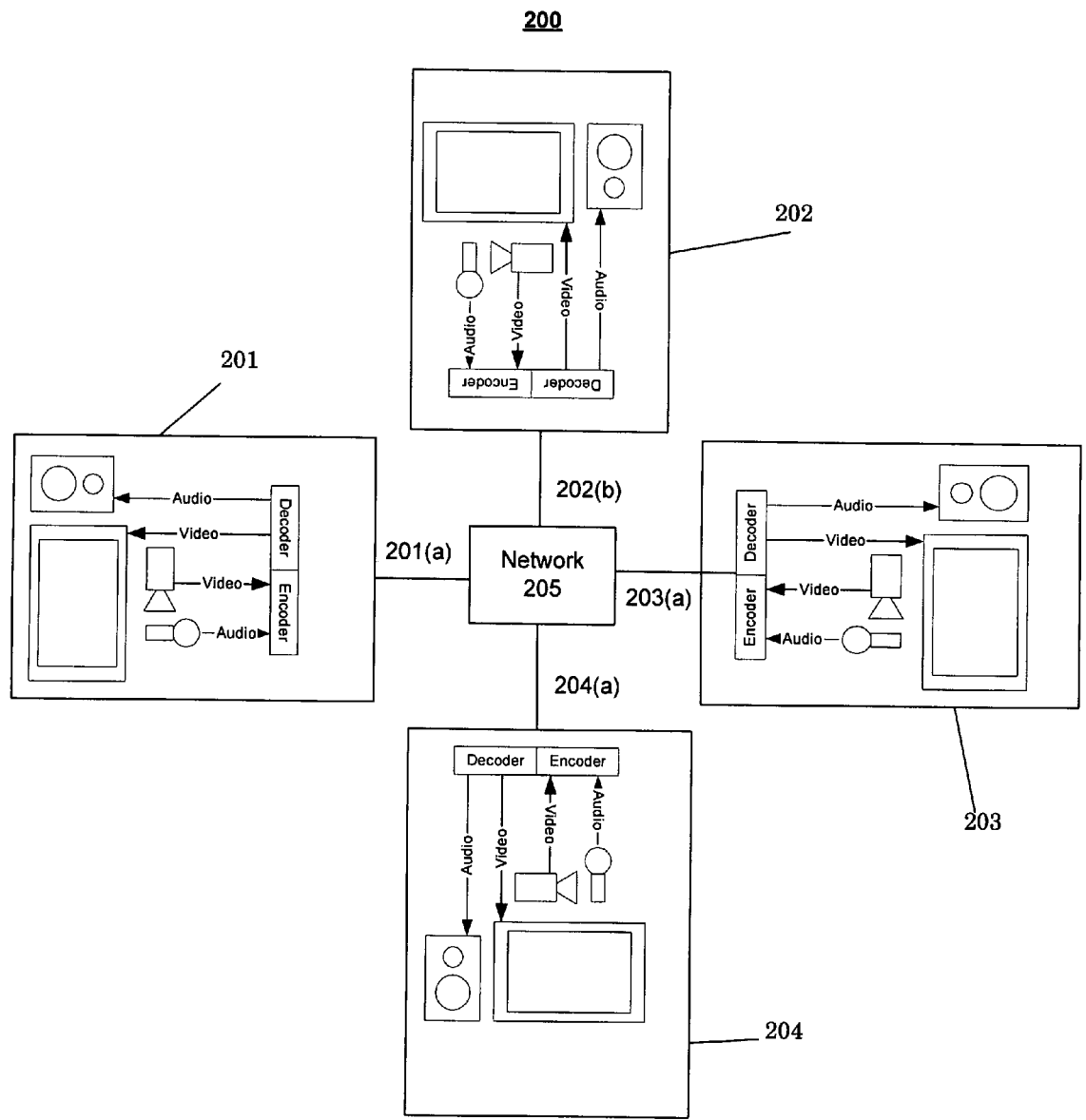
FIG. 2 is an exemplary video conference environment in accordance with an embodiment.

As shown in the drawings for purposes of illustration, a method of automatically calibrating a video conference system is disclosed. In an embodiment, the method generates a series of simultaneous and predefined audio and video signals and routes them through the various components of the video conference system. In an embodiment, the amount of time it takes for the audio and/or video signals to be processed by the components is respectively measured and a time differential in the absolute is determined as well as a time differential between the audio signals and the video signals. Accordingly, this time differential can be offset by adding delay to one or both of the signals thereby synchronizing the subsequently transmitted signals. By keeping the audio and video synchronized throughout the video conferencing system, video images of the lip movements of video conference participants are synchronized with the audio of the associated words. By implementing this automated feature, a synchronized audio and video stream is ensured without manual intervention.

FIG. 1 is a flowchart of a method in accordance with an embodiment. A first step 101 involves initiating a calibration sequence in the video conference system. In an embodiment, the video conferencing system includes audio and video components. A second step 102 involves routing a test signal through the audio and video components of the video conferencing system. A third step 103 includes measuring a time delay associated with the test signal. A final step 104 includes utilizing the time delay to calibrate subsequent audio and video signal transmissions by the video conferencing system. Again, by implementing this automated feature, a synchronized audio and video stream is ensured without manual intervention.

Referring to FIG. 2, an exemplary video conference environment 200 is illustrated. The environment 200 includes multiple video conference systems 201-204 associated with multiple sites of the video conference. The respective video conference systems 201-204 are located in different points in the environment 200 and send image and voice data of a video conference through the bi-directional digital transmission paths 201(a)-204(a) and simultaneously receive image and voice data of other video conference systems and display the images and output the voices thereof via network 205.

In an embodiment, the network 205 is a system that transmits any combination of voice, video and/or data between users. A network typically includes a network operating system, one or more computer systems, the cables connecting them and all supporting hardware and software in between such as bridges, routers and switches. The network operating system manages the different aspects of the network and makes it possible for the network components to transmit data therebetween.

Figure 3:
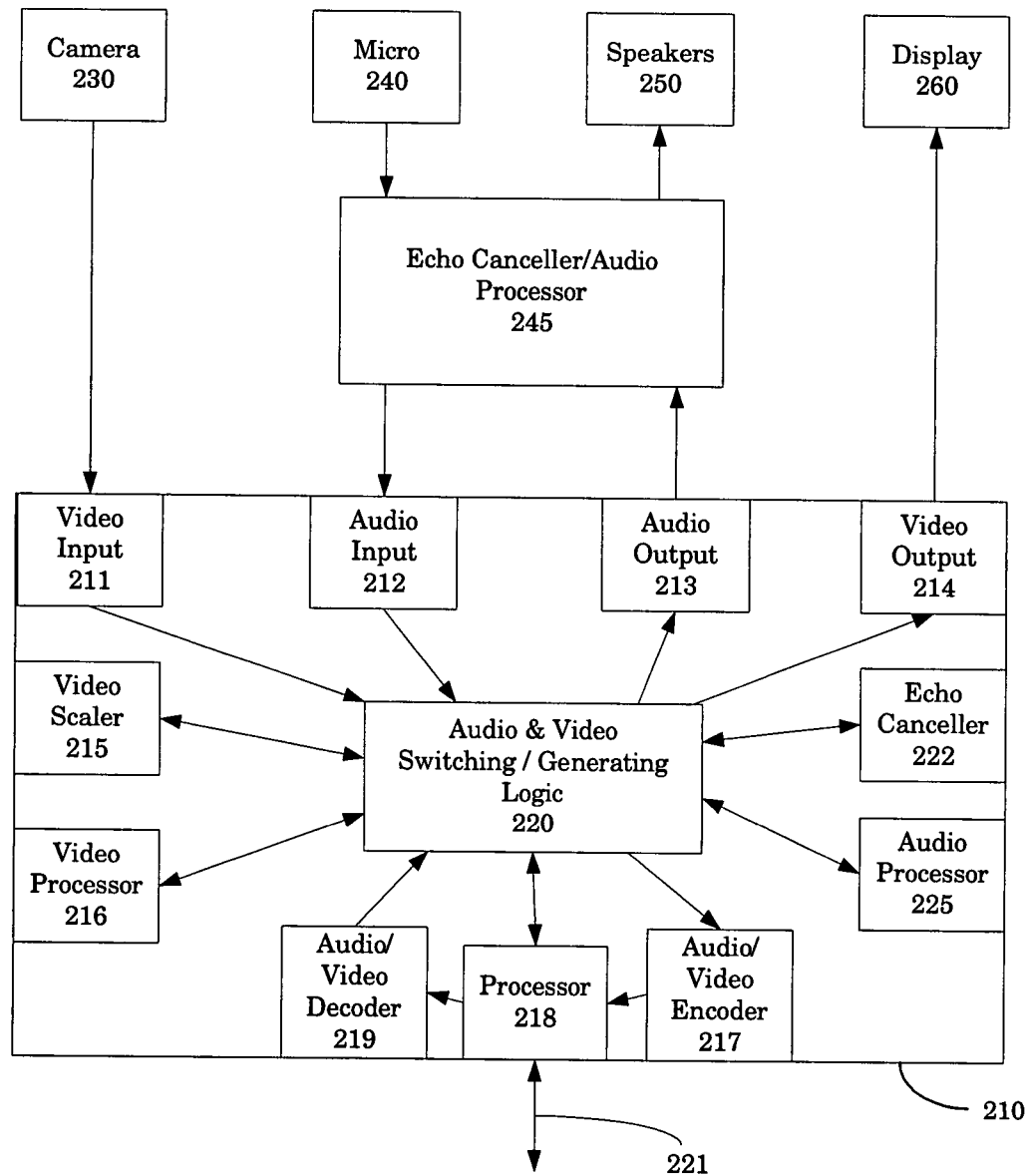
FIG. 3 is a block diagram showing a construction of an exemplary video conference system of the video conference environment in accordance with an embodiment.

FIG. 3 is a block diagram showing a construction of video conference system 201 of the video conference environment 200. Since the other video conference systems have the same construction as that of the video conference system 201, respectively, only the video conference system 201 need be described.

The video conference system 201 includes an audio/video (A/V) system 210. The A/V system 210 includes a video input 211, an audio input 212, an audio output 213 and a video output 214. The configuration 210 also includes a video scaler 215, a video processor 216, an A/V encoder 217, processor 218, A/V decoder 219 and an A/V switching and generating logic 220 wherein the A/V switching and generating logic 220 is coupled to an audio echo canceller 222 and an audio processor 225. Bi-directional digital transmission path 221 is configured for transmitting and receiving A/V data over the network 205.

The A/V system 210 is configured to communicate with a video camera 230 for input of the image of the participant, a microphone 240, a loud-speaker 250 for output of voices of other video conference participant(s) and a for input of a voice of a participant of the video conference and a display 260 for output of the image of another participant(s) of the video conference. The A/V system 210 is also configured to communicate with an audio processing component 245. The audio processing component 245 includes an audio processor and an echo canceller.

To send audio and video data over a network or to store it on a storage medium, the data is "encoded" or "compressed" since the "raw" or "uncompressed" audio/video data is to large to be feasibly transmitted over the network or store onto a storage medium. Encoding audio/video data significantly reduces the size of the data without significantly affecting the quality of the video. Decoding audio/video data involves "decompressing" the encoded data and thereby converting it into data that can be viewed or processed.

Video conferencing data is created by the video camera 230 and the microphone 240 whereby the microphone 240 creates audio data and the video camera create video data. When this data is encoded and transmitted it is referred to as a "stream". Usually audio and video streams are combined into one stream herein referred to as an A/V stream.

The A/V switching and generating logic 220 is configured for multiplexing and processing video signals received from video camera 230 via the video input 211 and audio signals received from the microphone 240 via the audio input 212. Additionally, the A/V switching and generating logic 220 transmits decoded A/V signals received from the A/V decoder 219 to the speaker 250 and the display 260 respectively via audio output 213 and video output 214.

In an embodiment, the A/V stream is generated from the camera 230 and the microphone 240, respectively. This stream is multiplexed by the A/V switching and generating logic 220 and transmitted to the A/V encoder 217. The encoded A/V data is then transmitted to other video conference participants via the bi-directional digital transmission path 221.

Although the system 201 is described in conjunction with above-delineated components, it should be noted that the system 201 is an exemplary system. One of ordinary skill in the art will readily recognize that a variety of different components could be employed while remaining within the spirit and scope of the inventive concepts. For example, the A/V system 210 is illustrated as a stand alone hardware unit, however the A/V system 210 could be implemented as functional software blocks within a personal computer (PC) system.

In an embodiment, an automatic calibration sequence can be initialized between various components in the A/V system to assess a time differential (skew) between the audio and video signals. Some components within the A/V system 210 process only audio signals, some process only video signals while others process A/V signals. Accordingly, time delays associated with these signals can be measured by testing the components that employ the respective audio, video and A/V signals.

A/V Signal Calibration

A/V signals are employed by the audio and video input pathways (components 211, 212), the audio and video output pathways (components 213, 214), the A/V encoder 217 and the A/V decoder 219. Accordingly, the skew associated with these components are measured in order to determine the A/V signal skew.

In order to determine the skew in the audio and video input and output pathways, a test A/V signal is generated via the A/V switching and generating logic 220 and transmitted to the audio and video outputs 213, 214. These signals are respectively picked up by the video camera 230 and the microphone 240 and transmitted back to the A/V switching and generating logic 220 via the video and audio inputs 211, 212 where the skew in the A/V signal is measured. This skew is associated with the audio and video input and output pathways.

It should be noted that the above process cannot ascertain the amount of skew associated with the output path and/or the input path. However, the skew associated with each can be ascertained by determining the skew associated with the input pathway. This is determined by first generating an externally synchronized audio and video signal. These signals captured by the video camera 230 and the microphone 240 and sent to the A/V switching and generating logic 220 via the video and audio inputs 211, 212 respectively where the skew in the A/V signal is measured. Consequently, this skew is associated with the input pathway. Accordingly, the input pathway skew can be subtracted from the skew associated with the audio and video input and output pathways in order to determine an output pathway skew.

To determine the skew generated by the A/V encoder 217 and the A/V decoder 219, a test A/V signal is generated via the A/V switching and generating logic 220 and transmitted to the A/V encoder 217. The signals are then sent to the processor 218 and then to the A/V decoder 219. The signals are then transmitted back to the A/V switching and generating logic 220 where the time differential in the A/V signal is measured. Accordingly, this time differential is the A/V skew associated with the encoder, decoder and possibly any other related circuitry.

Again, it should be noted that the above process cannot ascertain the amount of skew associated with the encoder 217 and/or the decoder 219. However, the skew associated with each can be ascertained by determining the skew associated with the decoder 219. This is determined by sending a set of packet(s) which contain known audio/video data from the processor to the A/V decoder 219. This A/V signal is then sent from the A/V decoder 219 to the A/V switching and generating logic 220 where the time differential in the A/V signal is measured. Consequently, this skew is associated with the A/V decoder 219. Accordingly, the A/V decoder 219 skew can be subtracted from the skew is associated with the A/V encoder 217 and the A/V decoder 219 in order to determine the skew associated with the A/V encoder 217.

Video Signal Calibration

Video signals are implemented in the video scaler 215 and the video processor 216. Accordingly, the skew associated with these components are measured in order to determine the video signal skew.

In order to determine the skew associated with either the video scaler 215 or the video processor 216, synchronized video signals are generated via the A/V switching and generating logic 220 and transmitted to the video scaler 215 and the video processor 216 respectively. The video signals are processed and routed back to the A/V switching and generating logic 220 where the amount of time it takes to process video signals in the video scaler 215 and the video processor 216 is respectively measured. This skew can be added into any skew offsets whenever the video signal is being routed through the video scaler 215 or the video processor 216. This skew directly affects the amount of video delay with respect to the audio signal.

Audio Signal Calibration

Audio signals are implemented in the audio echo canceller 222 and the audio processor 225. Accordingly, the skew associated with these components are measured in order to determine the audio signal skew.

In order to determine the skew associated with either the audio echo canceller 222 or the audio processor 225, synchronized audio signals are generated via the A/V switching and generating logic 220 and transmitted to the audio echo canceller 222 and the audio processor 225 respectively. The audio signals are processed and routed back to the A/V switching and generating logic 220 where the amount of time it takes to process the audio signals in audio echo canceller 222 or the audio processor 225 is measured. This skew can be added into any skew offsets whenever an audio signal is being routed through either the audio echo canceller 222 or the audio processor 225. This skew directly affects the amount of audio delay with respect to the video signal.

The calibration sequence can be initiated by an automated or manual stimulus thereby triggering a "calibration mode". Once in calibration mode, the display 260 and speakers 250 are deactivated so the end user does not hear annoying calibration noises and/or see distracting test patterns. Additionally, once the calibration information is calculated, the calibration information can be sent via path 221 to receiving video conference systems so that the calculated time differential(s) respective to the transmitted audio and video signals is known at the receiving video conference system as well. This allows any audio video synchronization to be implemented at the receiving system(s) as well. This further enhances the synchronization of the video conference environment.

A method of automatically calibrating a video conference environment is disclosed. In an embodiment, the method includes initiating a calibration sequence in the video conferencing system, routing a test signal through the audio and video components of the video conferencing system, measuring a time delay associated with the test signal and utilizing the time delay to calibrate subsequent audio and video signal transmissions by the video conferencing system. Through the implementation of the above-described methodology, calibration can be performed without human intervention saving time and complexity. The calibration is performed quickly thereby enabling frequent calibrations even at the start of every video conference. Additionally, no latency is added to the system during operation and no additional hardware is needed.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for automatically calibrating a video conferencing system.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of automatically calibrating a video conference system wherein the video conference system comprises a plurality of audio and video components, the method comprising:
    initiating a calibration sequence in the video conference system;
    routing a test signal from logic of the video conference system through the audio and video components and back to the logic of the video conference system;
    measuring a first time differential associated with the test signal received by the logic of the video conference system;
    routing a second signal from the audio and video components to the logic of the video conference system;
    measuring a second time differential associated with the second signal received by the logic of the video conference system;
    subtracting the second time differential from the first time differential to determine a third differential; and
    utilizing the time differentials to calibrate subsequent audio and video signal transmissions in the video conference system.

2. The method of claim 1 wherein the test signal comprises at least one of an audio/video (A/V) signal, an audio signal and a video signal.

3. The method of claim 2 wherein routing a test signal further comprises transmitting the A/V signal via an input A/V pathway and an output A/V pathway and measuring a first time differential associated with the test signal further comprises measuring a time differential associated with the A/V signal.

4. The method of claim 2 wherein routing a test signal further comprises transmitting the audio signal via the audio components and measuring a first time differential associated with the test signal further comprises measuring a time delay associated with the audio signal.

5. The method of claim 2 wherein routing a test signal further comprises transmitting the video signal via the video components and measuring a first time differential associated with the test signal further comprises measuring a time differential associated with the video signal.

6. The method of claim 1 wherein initiating a calibration sequence in the video conference system is performed in an automatic fashion.

7. The method of claim 1 further comprising sending the time differentials to another video conference system.

8. A non-transitory computer readable medium having computer readable instructions stored thereon for causing a computer to perform a method of calibrating a video conference system wherein the video conference system comprises a plurality of audio and video components, the method comprising:
    initiating a calibration sequence in the video conference system;
    routing a test signal from logic of the video conference system through the audio and video components and back to the logic of the video conference system;
    measuring a first time delay associated with the test signal received by the logic of the video conference system;
    routing a second signal from the audio and video components to the logic of the video conference system;
    measuring a second time delay associated with the second signal received by the logic of the video conference system;
    subtracting the second time delay from the first time delay to determine a third delay; and utilizing the time delays to calibrate subsequent audio and video signal transmissions in the video conference system.

9. The non-transitory computer readable medium of claim 8 wherein the test signal comprises at least one of an audio/video (A/V) signal, an audio signal and a video signal.

10. The non-transitory computer readable medium of claim 8 wherein routing a test signal further comprises transmitting the A/V signal via an input A/V pathway and an output A/V pathway and measuring a first time delay associated with the test signal further comprises measuring a time delay associated with the A/V signal.

11. The non-transitory computer readable medium of claim 9 wherein routing a test signal further comprises transmitting the audio signal via the audio components and measuring a first time delay associated with the test signal further comprises measuring a time delay associated with the audio signal.

12. The non-transitory computer readable medium of claim 9 wherein routing a test signal further comprises transmitting the video signal via the video components and measuring a first time delay associated with the test signal further comprises measuring a time delay associated with the video signal.

13. The non-transitory computer readable medium of claim 8 wherein initiating a calibration sequence in the video conference system is performed in an automatic fashion.

14. The non-transitory computer readable medium of claim 8 wherein the steps further comprise sending the time delays to another video conference system.

15. A video conference system comprising:
at least one audio component;
at least one video component;
an audio/video switching and generating logic coupled to the at least one audio and video component; and
means for performing an automatic calibration sequence, the calibration sequence comprising initiating a calibration sequence in the video conference system, routing a test signal from logic of the video conference system through the audio and video components and back to the logic of the video conference system, measuring a first time delay associated with the test signal received by the logic of the video conference system, routing a second signal from the audio and video components to the logic of the video conference system, measuring a second time delay associated with the second signal received by the logic of the video conference system, subtracting the second time delay from the first time delay to determine a third delay, and utilizing the time delays to calibrate subsequent audio and video signal transmissions in the video conference system.

16. The system of claim 15 wherein the test signal comprises an audio/video (A/V) signal, an audio signal and a video signal.

17. The system of claim 16 wherein routing a test signal further comprises transmitting the A/V signal via an input A/V pathway and an output A/V pathway and measuring a first time delay associated with the test signal further comprises measuring a time delay associated with the A/V signal.

18. The system of claim 16 wherein routing a test signal further comprises transmitting the audio signal via the audio components and measuring a first time delay associated with the test signal further comprises measuring a time delay associated with the audio signal.

19. The system of claim 16 wherein routing a test signal further comprises transmitting the video signal via the video components and measuring a first time delay associated with the test signal further comprises measuring a time delay associated with the video signal.

20. The system of claim 15 wherein initiating a calibration sequence in the video conference system is performed in an automatic fashion.

21. The method of claim 1 wherein the second signal comprises at least one of an audio/video (A/V) signal, an audio signal and a video signal.

* * * * *